United States Patent [19]

Habermann et al.

[11] Patent Number: 4,947,067
[45] Date of Patent: Aug. 7, 1990

[54] VIBRATOR/DAMPENER HAVING MAGNETIC SUSPENSION AND SERVO-CONTROL ALONG THREE AXES

[75] Inventors: Helmut Habermann; Pierre Lemerle, both of Vernon, France

[73] Assignee: Societe de Mecanique Magnetique S.A., Saint-Marcel, France

[21] Appl. No.: 335,099

[22] Filed: Apr. 6, 1989

[30] Foreign Application Priority Data

Apr. 20, 1988 [FR] France .................. 88 05242

[51] Int. Cl.⁵ .......................... H02K 7/09; B06B 1/04; F16C 39/06; G05B 11/01
[52] U.S. Cl. ......................................... 310/51; 73/668; 244/170; 310/81; 310/90.5; 318/114; 318/629
[58] Field of Search ................... 73/664, 668; 310/51, 310/81, 90.5, 254, 261; 318/114, 629, 631; 244/170

[56] References Cited

U.S. PATENT DOCUMENTS

| | | | |
|---|---|---|---|
| 3,209,602 | 10/1965 | Biderman | 310/90.5 |
| 3,458,239 | 7/1969 | Dorsman | 310/90.5 |
| 3,508,445 | 4/1970 | Penney, Jr. et al. | 310/90.5 |
| 3,911,732 | 10/1975 | Larson | 73/664 |
| 4,104,572 | 8/1978 | Hanson | 318/631 |
| 4,244,629 | 1/1981 | Habermann | 308/10 |
| 4,615,504 | 10/1986 | Sandercock | 248/550 |
| 4,626,754 | 12/1986 | Habermann et al. | 318/629 |
| 4,661,737 | 4/1987 | Barri | 310/261 |
| 4,686,404 | 8/1987 | Nakazeki | 318/629 |
| 4,748,851 | 6/1988 | Yoneda | 73/668 |
| 4,777,603 | 10/1988 | Woodman et al. | 318/631 |
| 4,824,052 | 4/1989 | Smay et al. | 244/170 |

FOREIGN PATENT DOCUMENTS

| | | | |
|---|---|---|---|
| 0157693 | 2/1988 | European Pat. Off. | |
| 294760 | 12/1988 | European Pat. Off. | 310/90.5 |
| 1190113 | 11/1985 | U.S.S.R. | 310/90.5 |
| 1197939 | 7/1970 | United Kingdom | |

Primary Examiner—Mark O. Budd
Assistant Examiner—D. L. Rebsch
Attorney, Agent, or Firm—Weingarten, Schurgin Gagnebin & Hayes

[57] ABSTRACT

A combination vibration generator and dampener having magnetic suspension and servo-control along three axes includes a hollow outer body fixed to a structure whose vibration is to be controlled, and an inner body which is essentially spherical in shape and which is inside the hollow outer body. Six active magnetic bearing elements are diametrically disposed in pairs along three orthogonal axes and serve to hold the inner spherical body inside the hollow outer body without direct contact between the inner and outer body. At least three position detectors detect the position of the inner body relative to the hollow outer body while at least one vibration detector device detects vibration forces on the structure whose vibration is to be controlled. Control apparatus, coupled to the position detectors and the vibration detector device, receives information from the position detectors and the vibration detector device for controlling the supply of power to the six active magnetic bearing elements in order to control the movement of the inner body in such a manner as to either set up forces on the outer body tending to generate vibration in the structure, or alternatively, to cancel vibration forces detected on the structure.

17 Claims, 4 Drawing Sheets

VIBRATOR/DAMPENER HAVING MAGNETIC SUSPENSION AND SERVO-CONTROL ALONG THREE AXES

The present invention relates to an active vibrator device having magnetic suspension with servo-control along three axes, said device being capable of acting as a damper or as an exciter.

BACKGROUND OF THE INVENTION

In numerous structures, and in particular in machine frames, it is necessary to damp the vibration generated in the structure by various periodic or aperiodic disturbances which may be internal or external to the structure, and which may be due to the presence of members moving in translation or in rotation, for example, or to hydrodynamic or aerodynamic effects.

It is common practice to remedy this by making use of passive dampers of hydraulic, pneumatic, or hydropneumatic type, or even by making use of internal or mechanical friction. However, the damping provided by such devices is not sufficiently fast or complete in countering the vibration that may appear on a structure.

Proposals have also been made to mount the structure to be stabilized directly on an active magnetic suspension, as in U.S. Pat. No. US-A-4 244 629 for example, which relates to stablizing a mass in order to damp oscillations that may occur in a horizontal plane. In this case, the mass to be stabilized is fixed to two elementds which constitute the rotors of radial magnetic bearings and which are loosely mounted inside two radial magnetic bearing stators which are fixed to the ground. Such mounting is not designed to damp vibration in a vertical direction, and it requires a pair of radial magnetic bearings to be used, each of which requires two pairs of electromagnets, together with the corresponding servo-control loops, and it also requires the bearing stators to be mounted on the ground or on the supporting platform and the bearing rotors to be mounted on arms connected to the mass to be stabilized. Such an implementation which is relatively complex to implement and which provides effective damping in one plane only is therefore suitable for special applications, only.

European patent specification No. EP-A-0 157 693 describes a method and apparatus for reducing vibration in rotary machines fitted with active magnetic suspension. This document requires at least one conventional active radial magnetic bearing to be incorporated inside the very structure to be stabilized, which structure can be constituted only by the frame of a rotary machine, with the stator of the radial magnetic bearing being fixed to the frame while the rotor of the radial magnetic bearing is fixed to the rotary shaft of the machine. Such vibration-reducing apparatus is also limited to special applications in which the vibrations to be damped are repetitive in nature. In addition, the incorporation of magnetic bearing components inside the machine to be stabilized can give rise to assembly operations which may be quite complex when the machine was not originally fitted with a mangetic suspension.

There also exist some applications where it is necessary, on the contrary, to generate vibrations in a structure, said vibrations being of predetermined frequency and amplitude, and being directed along various directions in three dimensional space. In such a case, a set of unidirectional vibrators may be applied to the structure, but in practice, the use of a plurality of distinct vibrators turns out to be complex and the resulting vibrations are difficult to monitor and control.

The present invention seeks to remedy the above drawbacks and to provide damping in a simple and effective manner by means of a universal and compact apparatus for damping the vibrations that may occur on a sturcture without it being necessary to change the internal organization of said structure, or on the contrary to excite a structure with vibrations along various directions by means of a single apparatus outside the structure.

SUMMARY OF THE INVENTION

These objects are achieved by means of an active vibrator device having magnetic suspension with servo-control along three axes, the device comprising: a hollow outer body fixed to a structure whose vibration is to be controlled; an inner body which is essentially spherical in shape and which is disposed inside the hollow outer body; six active magnetic bearing elements disposed in pairs on three axes XX', YY', ZZ' defining an orthogonal frame of reference and serving to hold the inner spherical body inside the hollow outer body without direct contact; at least three position detectors for detecting the position of the inner body relative to the hollow outer body; at least one vibration detector device; and servo-control circuits receiving information from the position detectors and from the vibration detector device and controlling the supply of power to the six active magnetic bearing elements in order to control the position of the inner body in such a manner as to set up reaction forces on the outer body tending to generate vibration in the structure or on the contrary to cancel vibration forces detected on the structure, depending on requirements.

According to a special feature, the essentially spherical inner body comprises a mass of non-magnetic material having: a first annular armature of ferromagnetic material anchored at the periphery thereof in a first groove having a first predetermined depth and centered on a first axis XX' of said orthogonal frame of reference XX', YY', ZZ'; and a second annular armature of ferromagnetic material anchored at the surface thereof in a second groove having a second predetermined depth which is less than said first predetermined depth and centered on a second axis ZZ' of said orthogonal frame of reference XX', YY', ZZ'; the second annular armature interfitting in the first annular armature which includes notches having said second predetermined depth in the vicinity of the third axis YY' of said orthogonal frame of reference XX', YY', ZZ'.

In a particular embodiment, each magnetic bearing element comprises a stator constituted by a U-shaped yoke of ferromagnetic material with electromagnetic windings wound round the two branches of the U-shape in symmetrical manner on either side of the axis of the bearing, and facing the corresponding annular armature of the inner body, and a position detector for detecting the position of the inner body is disposed between the two branches of each magnetic bearing element on the axis of symmetry of said bearing.

Advantageously, in this case, the first and second annular armatures are provided with small notches for forming respective teeth facing each branch of the stator U-shape of a magnetic bearing element, with the width of the tooth in the peripheral direction of the annular armature being equal to the width of the branch of said stator U-shape of the magnetic bearing element, so as to establish an edge effect preventing the inner body from rotating.

The inner hollow body is constituted by a bottom portion constituting a base substantially perpendicular to one of the axes, ZZ', of the orthogonal frame of reference XX', YY', ZZ' and fixed to said structure with a cup-forming portion supporting firstly a first magnetic bearing disposed on said axis ZZ' and secondly four magnetic bearing elements disposed on the other two axes XX', YY' of said orthogonal frame of reference XX', YY', ZZ', and a lid-forming top portion on which the second magnetic bearing element on said axis ZZ' is disposed.

The apparatus further includes mechanical locking means for holding the inner body insside the outer body when the device is in a rest position.

The mechanical locking means may be disposed in the gaps between the magnetic bearing elements and may act on the inner body at points constituting the vertices of a cube.

The mechanical locking means may include spring-forming elements or adjustable abutment-forming elements.

In a particular embodiment which facilitates installing the inner body inside the outer body, the essentially spherical inner body has eight smaller diameter flats in its periphery in the vicinity of the plane defined by said two other axes XX', YY' of the orthogonal frame of reference XX', YY', ZZ', said flats being formed between the portions of the first and second annular armatures that face the branches of the stator U-shapes of the magnetic bearing elements disposed on said two other axes XX', YY'.

BRIEF DESCRIPTION OF THE DRAWINGS

Embodiments of the invention are described by way of example with reference to the accompanying drawings, in which.

DETAILED DESCRIPTION

Figure 1:
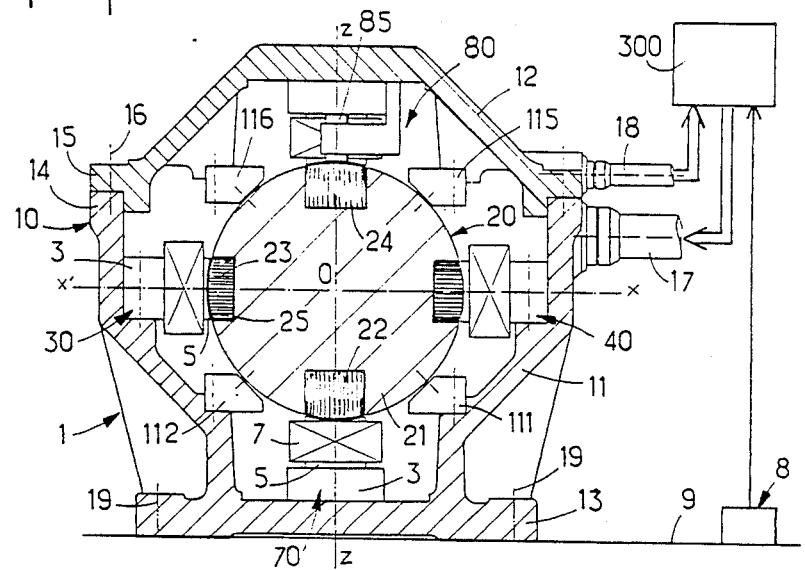
FIGS. 1 to 3 are diagrammatic section views on three mutually perpendicular planes through an active vibrator device in accordance with the invention.
Figure 2:
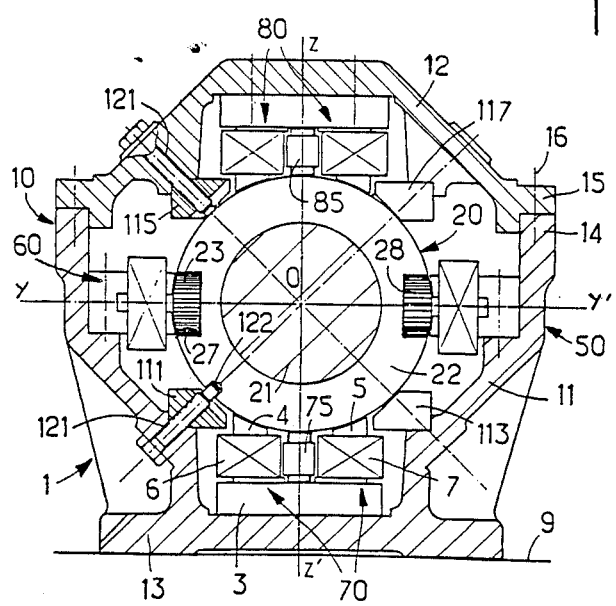
Figure 3:
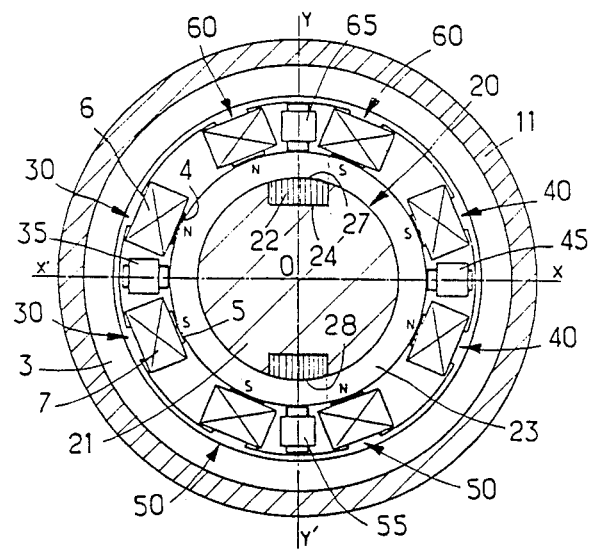

FIGS. 1 to 3 shown a compact device essentially comprising a closed block 1 including an outer body 10 provided with a base 13 fixed by fastening means 19 on a structure 9 to be stabilized, for example a machine frame, a working surface, or the wall of a vehicle or of a structure.

The device also includes a vibration detector device mounted on the structure 9 to be stabilized in the proximity of the block 1 and in an accurately determined relative position relative to said block 1. The vibration detector device 8 may be constituted by an absolute velocity meter or by an accelerometer and it serves to detect the vibrations applied to the structure 9 in three mutually perpendicular directions.

The device also includes servo-control circuits 300 which receive the signals delivered by the vibration detector device 8 for the purpose of servo-controlling the position of an inner body 20 which is substantially spherical in shape and which is loosely mounted inside the housing-forming outer body 10, such that the displacements of the inner spherical body 20 relative to the outer body 10 give rise to reaction forces on the structure 9 to be stabilized which oppose the detected vibration forces or which tend to reinforce these vibrations, depending on the particular application.

The position of the loosely mounted internal body 20 may be servo-controlled by means of a set of active magnetic bearing elements mounted in the outer body 10 and capable of exerting attraction forces in pairs of opposite directions on the inner body 20 and along three mutually perpendicular directions XX', YY', and ZZ' which define an orthogonal frame of reference centered on the center of the inner body 20 when the inner body takes up an equilibrium position.

The active magnetic bearing elements 30, 40, 50, 60, 70 and 80 are disposed in pairs along the three axes XX', YY', and ZZ' in order to maintain the inner spherical body 20 in suspension without coming into contact with the hollow outer body 10.

As shown in FIGS. 1 to 3 by way of example and with reference to bearing elements 30 and 70, the stator of each of the magnetic bearing elements 30, 40, 50, 60, 70, or 80 may comprise a yoke of laminated ferromagnetic material 3, 4, 5, which yoke is U-shaped, having two pole pieces 4 and 5 defining a north pole and a south pole with electromagnetic windings 6 and 7 wound thereabout and powered by power supply wired 17 from the servo-control circuit 300. The various U-shaped yokes of the stators of bearing elements 30, 40, 50, 60 situated in a common plane XOY may naturally be constituted by means of a single annular part 30 (optionally laminated) with the various pole pieces 4 and 5 projecting therefrom. In contrast, the stator of bearing element 70 at the bottom of the hollow body 10 and mounted on the base 13 on a vertical axis ZZ' is completely separate from the stator of the bearing element 80 which is diametrically opposite along the axis ZZ', and relative to the spherical body 20. The stator element of the top bearing 80 is mounted on a top portion 12 of the outer hollow body 10 which is separable from a bottom portion 11 which is in turn in the form of a cup fixed to the plate 13. The lid 12 rests via a flange 15 on the top rim 14 of the bottom portion 11 of the hollow body 10 and may be fixed thereto by fastening means 16.

By making the outer body 10 in portions 11 and 12, it is easy to assemble the various parts of the damper. The stator of the bottom bearing element 70 is initially mounted in the bottom of the cup 11 constituting the base 13, after which the stators of the middle bearing elements 30, 40, 50, and 60 disposed in the vicinity of the plane XOY to exert action along two axes XX' and YY' at right angles are disposed on a shoulder formed on the wall of the cup-forming element 11. The inner spherical body 20 is then placed inside the hollow body and appropriately positioned prior to the lid 12 carrying the stator of the top bearing element 80 being put into place on the bottom portion 11 of the outer body 10, in order to define the complete block 1.

The inner spherical body 20 is now described in greater detail. The inner body 20 comprises a core 21 of non-magnetic material which is essentially spherical in shape but which includes first and second orthogonal peripheral grooves 24 and 25 (FIG. 1) of different depths and in which annualar sets of ferromagnetic laminations are disposed, e.g. made of Fe-Si 3%, for the purpose of constituting first and second moving armatures 22 and 23 respectively co-operating with the stators of bearing 70 & 80, or 30, 40, 50, & 60.

Thus, the first annular armature 22 of ferromagnetic material is anchored in a relatively deep first annular groove 24 formed at the periphery of the spherical body 20 in the core 21 of non-magnetic material and centered on the axis XX'. The second annular armature 23 of ferromagnetic material is anchored in a second annular groove 25 which is shallower than the groove 24 and which is likewise formed at the periphery of the spherical body 20 in the core 21 of non-magnetic material, but this time centered on the axis ZZ'. In order to allow the second annular armature 23 to interfit with the first annular armature 22, the first armature has notches 27 and 28 of the same depth as the groove 25 and of width equal to the width of the armature 23 such that the two annular armature 22 and 23 can intersect over the bearing elements 50 and 60 situated on the axis YY' (FIGS. 2 and 3) while still ensuring that the inner body 20 has a substantially spherical outer surface. In order to enable the annular armatures 22 and 23 to be mounted on the core 21 of non-magnetic material, the core is itself constituted by means of a plurality of elements as described below in greater detail with reference to FIGS. 4 to 7.

The active vibrator device of the invention esssentially comprises two concentric bodies 10 and 20 whose relative positions are servo-controlled in such a manner as to set up reaction forces on the structure 9 to which the outer body 10 is fixed serving either to reduce the vibrations to which said structure 9 is subjected (in which case the vibrator device acts as a damper), or else on the contrary to generate or amplify vibrations which are required in the structure 9 (in which case the vibrator device acts as an exciter).

In the first case, the servo-control circuits 300 are controlled to operate in closed loop manner so as to define a damping device which sets up reaction forces on the outer body 10 which oppose the vibration forces detected on the structure 9 to be stablilized.

In the second case, the servo-control circuits 300 are controlled in open loop manner to define an exciter device which sets up forces on the outer body 10 for generating omnidirectional vibrations in the structure 9 to be destabilized.

The vibration detector device may comprise a three directional accelerometer device 8 disposed on the structure 9 in the vicinity of the outer body 10, or on the outer body itself.

The vibration detector device may, alternatively, comprise a three dimensional accelerometer device disposed in the center of the hollow inner spherical body 20 and delivering negative feedback controlling signals to the servo-control circuits 300.

In the following description, particular consideration is given to an active vibrator device of the invention used as a damper.

As already mentioned, the position of the inner body 20 relative to the outer body 10 is servo-controlled by the magnetic bearing elements 30, 40, 50, 60, 70, and 80 which are powered by the servo-control circuits 300 via lines 17, while the servo-control circuits are controlled by information delivered by the vibration detector device 8, in such a manner that the displacements of the inner body 20 give rise to reaction forces on the outer body 10 and consequently on the structure 9 so as to reduce or even cancel the vibration forces to which the structure 9 is subject. The servo-control circuits 300 thus include input circuits receiving signals from the detection device 8 and performing one integration if the vibration detection device 8 is of the velocity meter type, or two integrations if the vibration detector device 8 is of the accelerometer type. The remainder of the servo-control system for the bearing elements 30, 40, 50, 60, 70, and 80 can be constituted in conventional manner.

In order to prevent the inner body 20 from coming into contact with the stators of the bearing elements 30, 40, 50, 60, 70, and 80, and in order to position the inner body 20 in a position which is accurately centered inside the hollow body 10 when the damper is in operation and in the absence of any internal vibration, position detectors 35, 45, 55, 65, 75, and 85, e.g. inductive or capacitive type detectors, are disposed in the vicinity of each of the bearing elements 30, 40, 50, 60, 70, and 80 facing the inner spherical body 20 and delivering information to the servo-control circuits 300 over lines 18 relating to the position of the inner body 20 relative to the various magnetic bearing elements 30, 40, 50, 60, 70, and 80. The signals delivered by the position detectors 35, 45, 55, 65, 75, and 85 are thus taken into account firstly, when the damper is put into operation, to define a center equilibrium position for the inner body 20 which is loosely mounted inside the hollow body 10, assuming there are no vibrations to be compensated, and secondly to limit the amplitude of the motion of the inner body 20 in the event of vibration being too violent.

As shown in FIGS. 1 to 3, the detectors 35, 45, 55, 65, 75, and 85 may be disposed between the pole pieces 4 and 5 of each of the stators of the magnetic bearing elements 30, 40, 50, 60, 70, and 80, thereby limiting the overall volume occupied by the magnetic suspension system.

In order to lock the inner spherical body in position when the damper is not in operation, i.e. when the magnetic bearing elements 30, 40, 50, 60, 70, and 80, are not powered by the circuits 300, mechanical abutment means 111 to 118 are disposed in the gaps between the stators of the magnetic bearing elements 30, 40, 50, 60, 70, and 80. The abutment means 111 to 118 may be eight in number, for example, and may be positioned in such a manner as to exert locking action on the inner body 20 at points occupying the vertices of a cube. However, this disposition is not absolutely essentiqal and the abutment means 111 to 118 could be no more than six or even four in number.

The mechanical locking means 111 to 118 may be grouped together at a first group of locking means 111 to 114 mounted on the bottom portion 11 constituting the cup of the outer body 10 and a seocnd group of four locking means 111 to 118 mounted on the top portion 12 constituting the lid of the outer body 10. As shown in FIG. 2, the locking means 111 to 118 may be operated from outside the body 1, and each may include a retractable screw 121 enabling the inner spherical body 20 to be locked selectively in any predetermined position by engaging the screws in blind holes 122 formed in the periphery of the body 20.

In a variant (FIG. 6) the locking means 111 to 118 may include springs 131 each having one end anchored on the inner body 20 and the other end attached to the outer body 10 so as to prevent the inner spherical body 20 from rotating when the damper is at rest.

Figure 5:
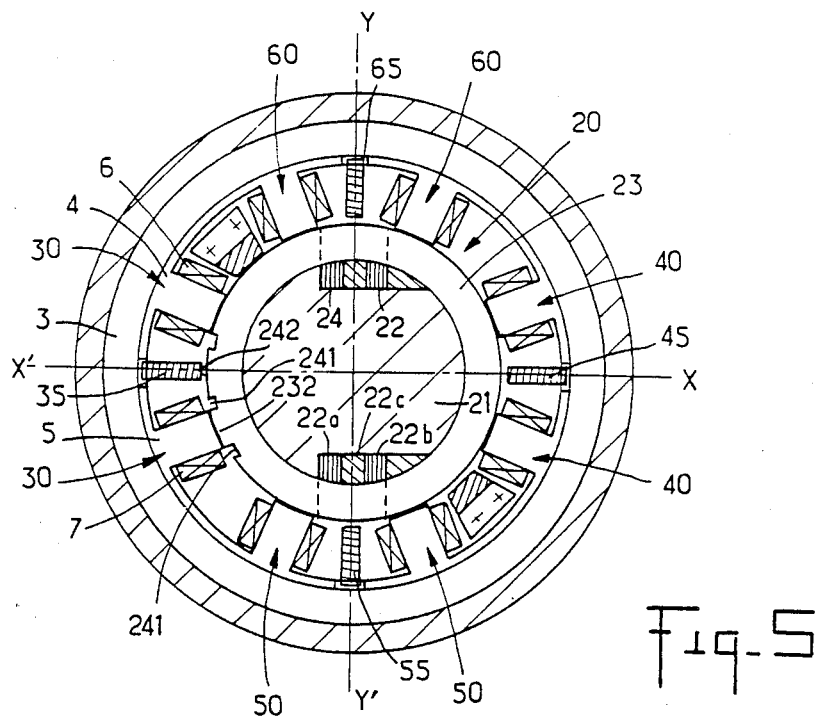
Figure 6:
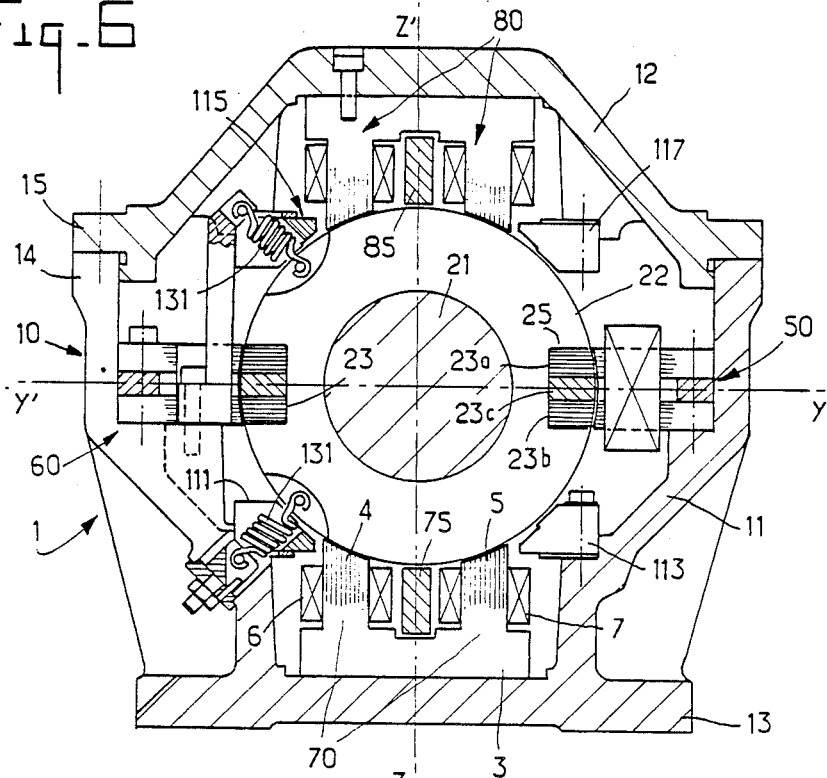
FIG. 6 is a view analogous to FIG. 1, on a different scale and showing a variant embodiment of the means for locking the inner body in position when stopped.

In normal operation, i.e. when the magnetic bearing elements are powered, rotation of the inner spherical body 20 is prevented by special means of the passive suspension type defined by the so-called "edge" effect of the magnetic bearings. Thus, as shown in FIG. 5, small notches 241 are formed on the annular armatures 22 and 23 in order to define a tooth 242 facing each branch 4, 5 of the U-shape of the stator 3, 4, 5 of at least one of the magnetic bearing elements, e.g. the element 30, said tooth 242 having a width in the peripheral direction of the annular armature 23 which is equal to the width of the branch 4, 5 of the stator U-shape of the corresponding bearing element 30. Teeth 242 thus be made facing each of the stator pole pieces 4, 5 of the entire set of magnetic bearing elements, or of some of the elements only. By defining teeth on the armatures of the loosely mounted body 20 corresponding to the stator pole pieces 4 and 5, passive type repulsion forces are set up between the inner body 20 and the outer body 10 which prevent the inner body 20 from rotating.

Figure 4:
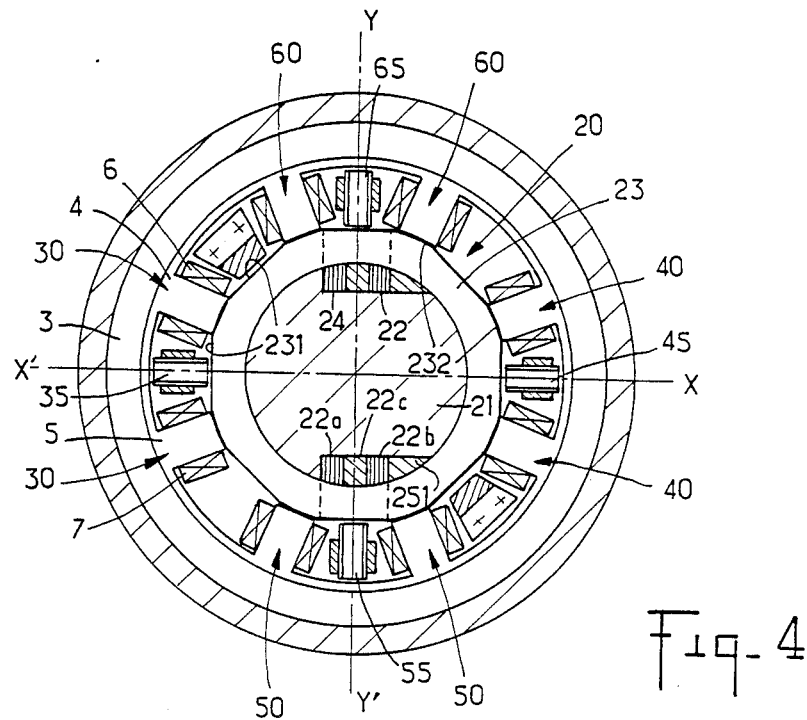
FIGS. 4 and 5 are views analogous to FIG. 3 but on a different scale and showing details of the structure of the inner body of a device of the invention.

In a variant embodiment, shown in FIG. 4, the teeth 232 formed on at least the armature 23 of the body 20 and situated facing stator pole pieces 4 and 5 are not delimited by small grooves, but by empty portions defining small diameter flats 231 at the periphery of the spherical body 20. In this way, an edge effect is created over the stator pole pieces 4 and 5 of the bearing elements 30, 40, 50, and 60, and in addition, inserting the inner body 20 is made easier. The spherical body 20 may be inserted inside the bottom 11 of the outer body 10 by being rotated by 45° in the plane XOY relative to its normal position. In this way, the flats 231 face the stator pole pieces 4 and 5 of the braring elements, thereby enabling the inner body 20 to be engaged freely in spite of the curved shape of the pole pieces 4 and 5 which have overhanging portions above the plane XOY defining a passage which is smaller than the normal diameter of the inner body 20 (see FIGS. 1, 2, 6, and 7). In this way, it is possible to assemble bearing elements 30, 40, 50, and 60 fully prior to inserting the inner body 20. After the inner body 20 has been inserted into the bottom portion 11 of the outer body 10, it can then be rotated through 45° about the vertical sxis ZZ' in order to take up its final position shown in FIG. 4.

Figure 7:
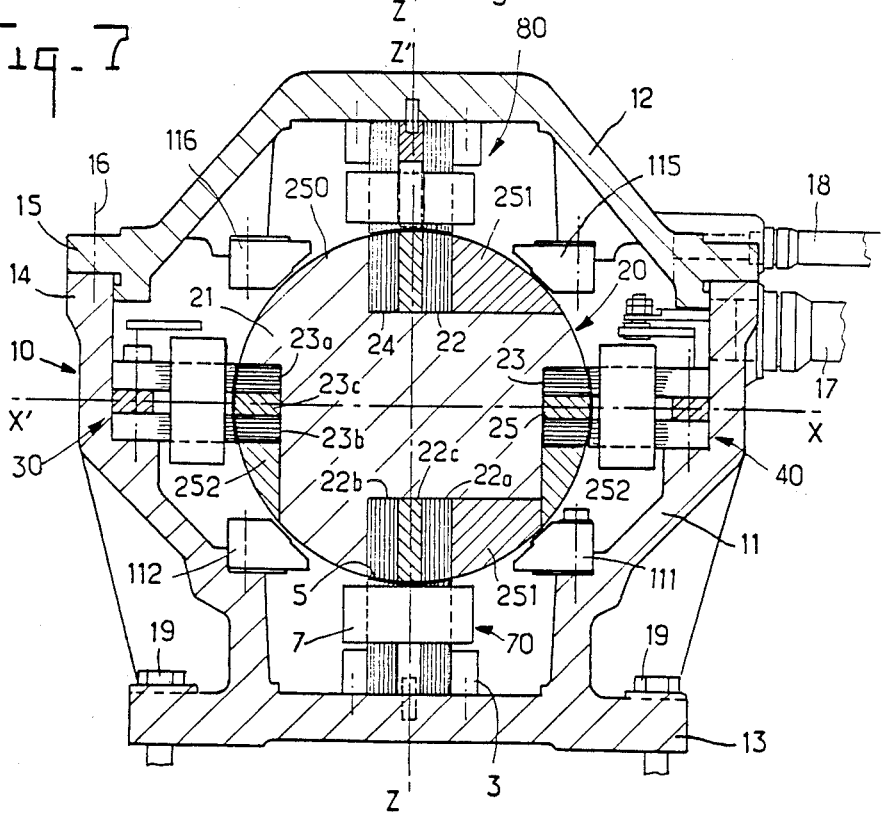
FIG. 7 is a view analogous to FIG. 2, on a different scale and showing details of the inner body of the vibrator device.

FIG. 7 shows that the inner body 20 may have a core 21 of non-magnetic material constituted by a pluratily of elements 250, 251, 252, so as to begin by defining the grooves 24 and 25 in a manner which is open for receiving the crossed ferromagnetic annular armatures 22 and 23 in simple translation, with the body 20 being completed to take up its essentially spherical shape only after the armatures 22 and 23 have been put into place. The core 21 of non-magnetic material may thus comprise a central element 250 together with additional pieces 251 and 252 which are applied thereto after the ferromagnetic annular armatures 22 and 23 have been put into place.

FIGS. 4 to 7 show that the annular ferromagnetic armatures 22 and 23 may include two sets of laminations 22a & 22b and 23a & 23b which are separated by respective intermediate portions 22c and 23c made of non-magnetic material.

A plurality of active vibrator devices of the invention may be used simultaneously on a common structure 9 co-operating with a plurality of vibration detector devices disposed on the structure 9 and connected to servo-control circuits which are grouped together in a central control unit making use of an influence matrix.

We claim:

1. A combination vibration generator and dampener having magnetic suspension with servo-control along three axes, comprising: a hollow outer body fixed to a structure whose vibration is to be controlled; an inner body which is essentially spherical in shape and which is disposed inside the hollow outer body; six active magnetic bearing elements diametrically disposed in pairs on three axes XX', YY', ZZ' defining an orthogonal frame of reference and serving to hold the inner spherical body inside the hollow outer body without direct contact with the hollow outer body; at least three possition detectors for detecting the position of the inner body relative to the hollow outer body; at least one vibration detector device for detecting vibration forces on the structure whose vibration is to be controlled; and servo-control apparatus coupled to said at least three position detectors and said at least one vibration detector device, for receiving information from the position detectors and from the vibration detector device and controlling the supply of power to the six active magnetic bearing elements in order to control the movement of the inner body in such a mannner as to either set up reaction forces on the outer body tending to generate vibration in the structure or to cancel vibration forces detected on the structure, depending on requirements.

2. A device according to claim 1, wherein the essentially spherical inner body comprises a mass of non-magnetic material having: a first annular armature of ferromagnetic material anchored at the periphery thereof in a first groove having a first predetermined depth and centered on a first axis XX' of said orthogonal frame of reference XX', YY', ZZ'; and a second annular armature of ferromagnetic material anchored at the surface thereof in a second groove having a second predetermined depth which is less than said first predetermined depth and centered on a second axis ZZ' of said orthogonal frame of reference XX', YY', ZZ'; the second annular armature interfitting in the first annular which includes notches having said second predetermined depth in the vicinity of the third axis YY' of said orthogonal frame of reference XX', YY', ZZ'.

3. A device according to claim 2, wherein the first and second annular armatures are constituted by stacks of ferromagnetic laminations.

4. A device according to claim 1, wherein each magnetic bearing element comprises a stator constituted by a U-shaped yoke of ferromagnetic material with electromagnetic windings wound round the two branches of the U-shape in symmetrical manner on either side of the axis of the bearing, and facing the corresponding annular armature of the inner body, and wherein a position detector for detecting the position of the inner body is disposed between the two branches of each magnetic bearing element on the axis of symmetry of said bearing.

5. A device according to claim 4, wherein the first and second annular armatures are provided with small notches for forming respective teeth facing each branch of the stator U-shape of a magnetic bearing element, with the width of the tooth in the peripheral direction of the annular armature being equal to the width of the branch of said stator U-shape of the magnetic bearing element, so as to establish an edge effect preventing the inner body from rotating.

6. A device according to claim 1, wherein the outer hollow body is constituted by a bottom portion constituting a base substantially perpendicular to one of the axes, ZZ', of the orthogonal frame of reference XX', YY', ZZ' and fixed to said structure with a cup-forming portion supporting firstly a first magnetic bearing disposed on said axis ZZ' and secondly four magnetic bearing elements disposed on the other two axes XX', YY' of said orthogonal frame of reference XX', YY', ZZ', and a lid-forming top portion on which the second magnetic bearing element on said axis ZZ' is disposed.

7. A device according to claim 1, further including mechanical locking means for holding the inner body inside the outer body when the device is in a rest position.

8. A device according to claim 7, wherein the mechanical locking means are disposed in the gaps between the magnetic bearing elements and act on the inner body at points constituting the vertices of a cube.

9. A device according to claim 7, wherein the mechanical locking means includes spring-forming elements.

10. A device according to claim 6, wherein each magnetic bearing element comprises a stator constituted by a U-shaped yoke of ferromagnetic material with electromagnetic windings wound round the two branches of the U-shape in symmetrical manner on either side of the axis of the bearing, and facing the corresponding annular armature of the inner body, wherein a position detector for detecting the position of the inner body is disposed between the two branches of each magnetic bearing element on the axis of symmetry of said bearing, and wherein the essentially spherical inner body has eight smaller-diameter flats in its periphery in the vicinity of the plane defined by said two other axes XX', YY' of the orthogonal frame of reference XX', YY', ZZ', said flats being formed between the portions of the first and second annular armature that face the branches of the stator U-shape of the magnetic bearing elements disposed on said two other axes XX', YY'.

11. A device according to claim 1, wherein the vibration detector device comprises an accelerometer on a structural element which is integral with the structure whose vibration is to be controlled.

12. A device according to claim 1, wherein the vibration detector device comprises a three-dimensional accelerometer device disposed in the middle of the inner spherical body which is hollow, said vibration detector device delivering control signals to the servo-control circuits.

13. A device according to claim 1, wherein the servo-control apparatus operates to define the combination vibration generator and dampener as a damper which sets up reaction forces on the outer body opposing the vibration forces detected on the structure whose vibration is to be controlled.

14. A device according to claim 1, wherein the servo-control apparatus operates to define the combination vibration generator and dampener as a generator for setting up forces on the outer body for generating omnidirectional vibration in the structure whose vibration is to be controlled.

15. A combination vibration generator and dampener having magnetic suspension with servo-control along three axes, comprising: a hollow outer body fixed to a structure whose vibration is to be controlled; an inner body which is essentially spoherical in shape and which is disposed inside the hollow outer body; six active magnetic bearing elements diametrically disposed in pairs on three axes defining an orthogonal frame of reference and serving to hold the inner spherical body inside the hollow outer body without direct contact with the hollow outer body; said outer hollow body comprising a bottom portion including a base substantially perpendicular to a first one of said three axes, and including a cup-forming portion supporting a first magnetic bearing disposed on said first axis, and four magnetic bearing elements disposed along the two remaining axes, one pair of magnetic bearing elements per axis, and a lid-forming top portion on which the second magnetic bearing of said first axis is disposed; at least three position detectors for detecting the position of the inner body relative to the hollow outer body; at least one vibration detector device for detecting vibration forces on the structure whose vibration is to be controlled; and servo-control apparatus coupled to said at least three position detectors and said at least one vibration detector device, for receiving information from the position detectors and from the vibration detector device and controlling the supply of power to the six active magnetic bearing elements in order to control the movement of the inner body in such a manner as to either set up reaction forces on the outer body tending to generate vibration in the structure or to cancel vibration forces detected on the structure.

16. A device according to claim 7 wherein the mechanical locking means include adjustable abutment-forming elements.

17. A device according to claim 1, wherein the vibration detector device comprises an absolute velocity meter disposed on a structure element which is integral with the strucute whose vibration is to be controlled.

* * * * *

UNITED STATES PATENT AND TRADEMARK OFFICE
CERTIFICATE OF CORRECTION

PATENT NO. : 4,947,067

DATED : August 7, 1990

INVENTOR(S) : Helmut Habermann, et al

It is certified that error appears in the above-identified patent and that said Letters Patent is hereby corrected as shown below:

Abstract, line 5, 6, "which is inside" should read --which is disposed inside--.

In Column 1, line 30, "elementds" should read --elements--.

In Column 4, line 33, "wired" should read --wires--.

In Column 5, line 7, "bearing 70" should read --bearing elements 70--.

In Column 5, line 22, "armature" should read --armatures--.

Column 6, line 52, "essentiqual" should read --essential--.

In Column 7, line 16, "242 thus" should read --242 can thus--.

In Column 7, line 46, "sxis" should read --axis--.

In Column 8, line 16, "possition" should read --position--.

UNITED STATES PATENT AND TRADEMARK OFFICE
CERTIFICATE OF CORRECTION

PATENT NO. : 4,947,067

DATED : August 7, 1990

INVENTOR(S) : Helmut Habermann, et al

It is certified that error appears in the above-identified patent and that said Letters Patent is hereby corrected as shown below:

Column 8, line 44,45, "annular which" should read --annular armature which--.

In Column 9, line 40, "armature" should read --armatures--.

Column 10, line 17, "spoherical" should read --spherical--.

Signed and Sealed this

Twenty-second Day of June, 1993

Attest:

MICHAEL K. KIRK

*Attesting Officer*     *Acting Commissioner of Patents and Trademarks*